Dec. 8, 1970 J. O. MOORHEAD ET AL 3,546,651

THERMAL TIME DELAY RELAY

Filed Dec. 8, 1967 7 Sheets-Sheet 1

Inventors:
John O. Moorhead,
Claude P. Charamond,
by James P. McAndrews
Att'y.

Inventors:
John O. Moorhead,
Claude P. Charamond,
by James P. McAndrews
Att'y.

Inventors:
John O. Moorhead,
Claude P. Charamond,
by James P. McAndrews
Att'y.

Inventors:
John O. Moorhead,
Claude P. Charamond
by James P. McAndrews
Att'y.

Inventors:
John O. Moorhead,
Claude P. Charamond,
by James P. McAndrews
Att'y.

THERMAL TIME DELAY RELAY

Filed Dec. 8, 1967

Inventors:
John O. Moorhead,
Claude P. Charamond,
by James P. McAndrews
Att'y.

THERMAL TIME DELAY RELAY

Inventors:
John O. Moorhead,
Claude P. Charamond,
by James P. McAndrews
Att'y.

3,546,651
THERMAL TIME DELAY RELAY

John O. Moorhead, Lexington, and Claude P. Charamond, Versailles, Ky., assignors to Texas Instruments Incorporated, Dallas, Tex., a corporation of Delaware Filed Dec. 8, 1967, Ser. No. 689,021
Int. Cl. H01h 37/04, 37/52
U.S. Cl. 337—102 17 Claims

ABSTRACT OF THE DISCLOSURE

A thermal time delay relay particularly adapted for use in systems for degaussing color television receivers is shown to comprise an insulating base; a post structure upstanding from the base; at least one resilient blade mounted in cantilever relation on the post structure to extend over the base, the blade supporting a fixed contact at its distal end and having an integral terminal portion fitted into a slot in the base for locating the fixed contact with respect to the base; thermally-responsive means mounted in cantilever relation on the post structure to support at least one movable contact above the blade contact at the distal end of the thermally-responsive means, the thermally-responsive means also preferably having integral terminal means fitted into a slot in the base for locating the movable contact relative to the fixed contact; heater means having terminal means at one end mounted on the post structure and having terminal means at its opposite end fitted into a slot in the base for locating the heater means in selected heat-transfer relation to the thermally-responsive means; and adjusting means threadedly engaged in the base to bear against the resilient blade for resiliently positioning the fixed contact in selected spaced relation to the movable contact. In this arrangement, the thermally-responsive means move in response to heat generated by the heater means to close a circuit through the fixed and movable contacts, this circuit being closed a selected period of time after closing of a circuit through the heater means. Various embodiments of the relay are shown to provide ambient-compensation, high-current-conducting capacity, double-pole operation, sequencing operation and other advantageous features. In one embodiment of the relay, the thermally-responsive means supporting the movable relay contact and the resilient blade supporting the fixed relay contact each incorporate integral auxiliary blade means, these auxiliary blade means extending into a chamber formed in the insulating base to hold a thermistor therebetween to provide an auxiliary circuit in parallel with the relay heater means and with the circuit to be formed between the fixed and movable relay contacts. In this embodiment of the relay, self-heating of the resistor in the auxiliary circuit in response to current therethrough, gradually increases the current in the auxiliary circuit, and movement of the thermally-responsive means in response to heat generated by the heater means closes a circuit to shunt the auxiliary circuit in a selected period of time after a circuit is closed through the auxiliary circuit and heater means. When a degaussing coil of a color television receiver is connected in parallel with said relay circuits, increasing current in the auxiliary circuit provides a decreasing current in the degaussing coil and subsequent closing of the relay contacts shunts the degaussing coil after a selected period of time.

Color television receivers of various types presently proposed embody degaussing coils which are energized each time that the receiver is actuated from a cold-start for removing undesired magnetic effects in the receivers resulting from the earth's magnetic field and the like.

These degaussing coils are provided with a current which rapidly decays to a minimal current within a few seconds after energization for accomplishing degaussing of the receivers. It is then desirable to deenergize the coils automatically, preferably before the receiver furnishes a color picture so that the viewer of the color picture does not observe any effects of the degaussing operation. Time delay relays intended to accomplish deenergization of the degaussing coils must be adapted to operate rapidly, accurately and uniformly to assure that deenergization of the coils occurs within the short span of time between completion of degaussing and presentation of a color picture under all of the various ambient temperature conditions to which the relay will be subjected. Further, to be practical for their intended purpose, such relays must be relatively inexpensive to manufacture, assemble and calibrate; should be readily adapted for use with various types of color television receivers; and must have a long service life.

It is an object of this invention to provide a novel and improved time delay relay; to provide such relays which operate rapidly, accurately and uniformly under all of the various ambient temperature conditions to which the relays will be subjected; to provide such relays which operate with snap-action; to provide such relays which embody inexpensive and easily assembled components; to provide such relays which are easy to calibrate; to provide such relays which have a long service life; and to provide such relays which are readily adapted for use in degaussing color television receivers of various types.

It is a further object of this invention to provide time delay relays of various types utilizing interchangeable component parts which are easily assembled to provide relays of a variety of selected characteristics; to provide such relays incorporating thermostatic elements which retain uniform operating characteristics over a long service life; to provide such relays which utilize inexpensive heater units adapted to achieve rapid relay operation without developing excessive relay temperatures; to provide such relays which, in addition to their capability of deenergizing degaussing coils for color television receivers, are also adapted to regulate current furnished to such degaussing coils; to provide such relays which operate with minimum power consumption; and to provide such time delay relays which are inexpensive to manufacture and use.

Other objects, advantages and details of the time delay relays provided by this invention appear in the following detailed description of preferred embodiments of the invention, the detailed descriptions referring to the drawings in which.

Figure 1:
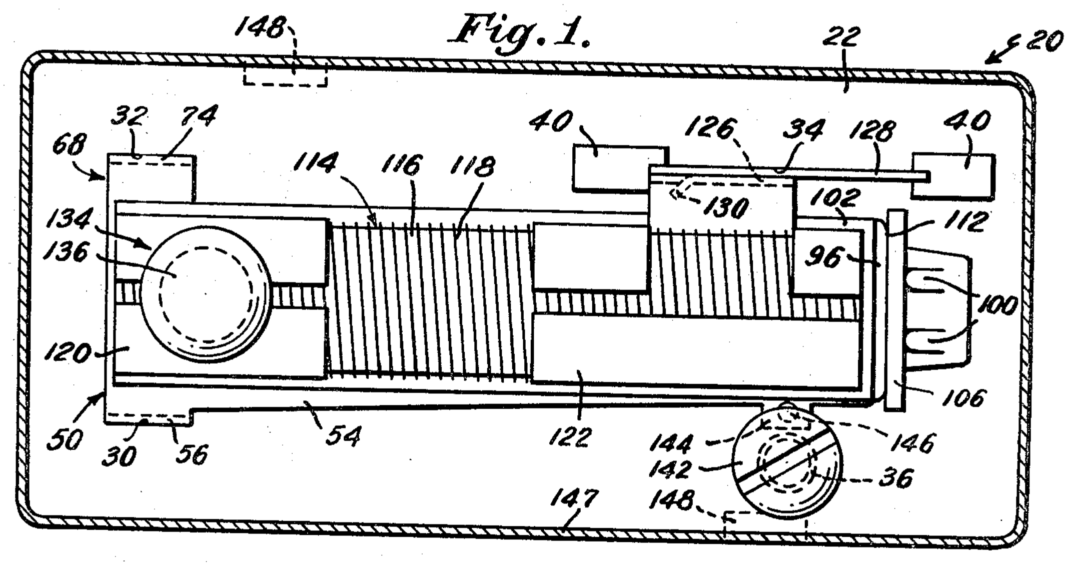
FIG. 1 is a plan view of a preferred embodiment of the time delay relay of this invention showing the relay with its cover removed.
Figure 2:
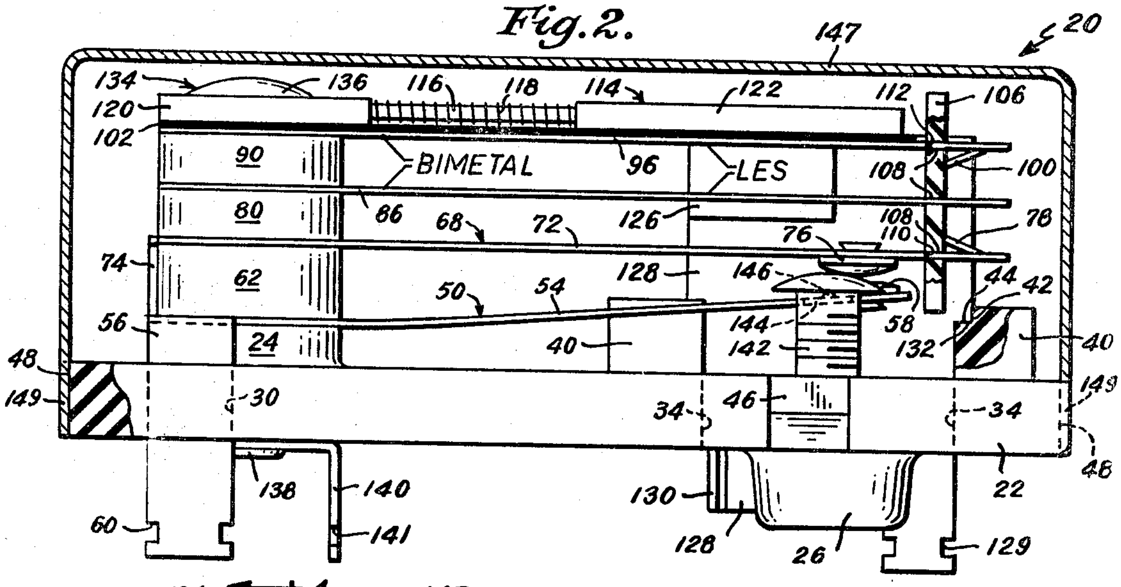
FIG. 2 is a front elevation view of the relay of FIG. 1 showing the relay cover in section.
Figure 3:
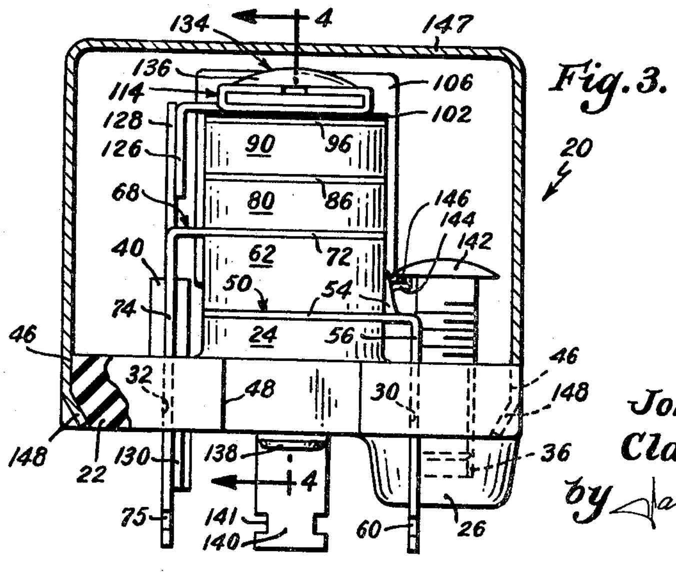
FIG. 3 is an end elevation view of the relay of FIG. 1 showing the relay cover in section.
Figure 5:
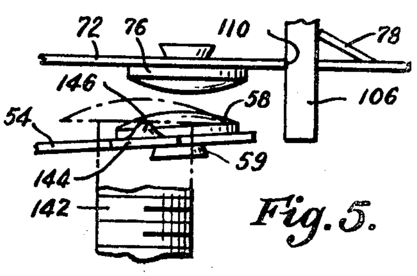
FIG. 5 is a partial view, to enlarged scale, similar to FIG. 1 illustrating calibration of the relay of FIG. 1.
Figure 6:
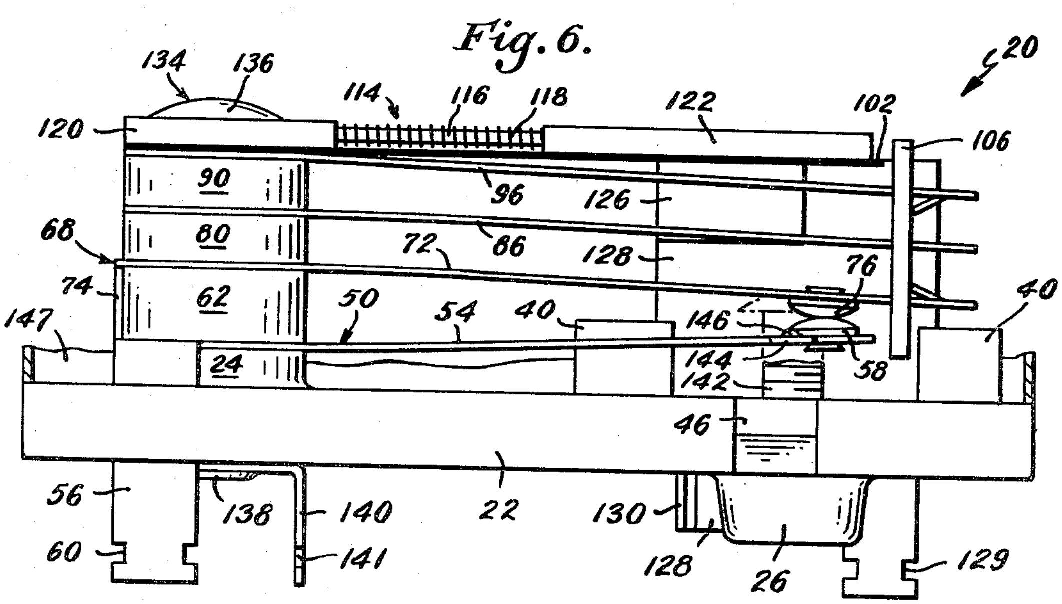
FIG. 6 is a front elevation view of the relay of FIG. 1 illustrating the relay in contacts-closed position.
Figure 4:
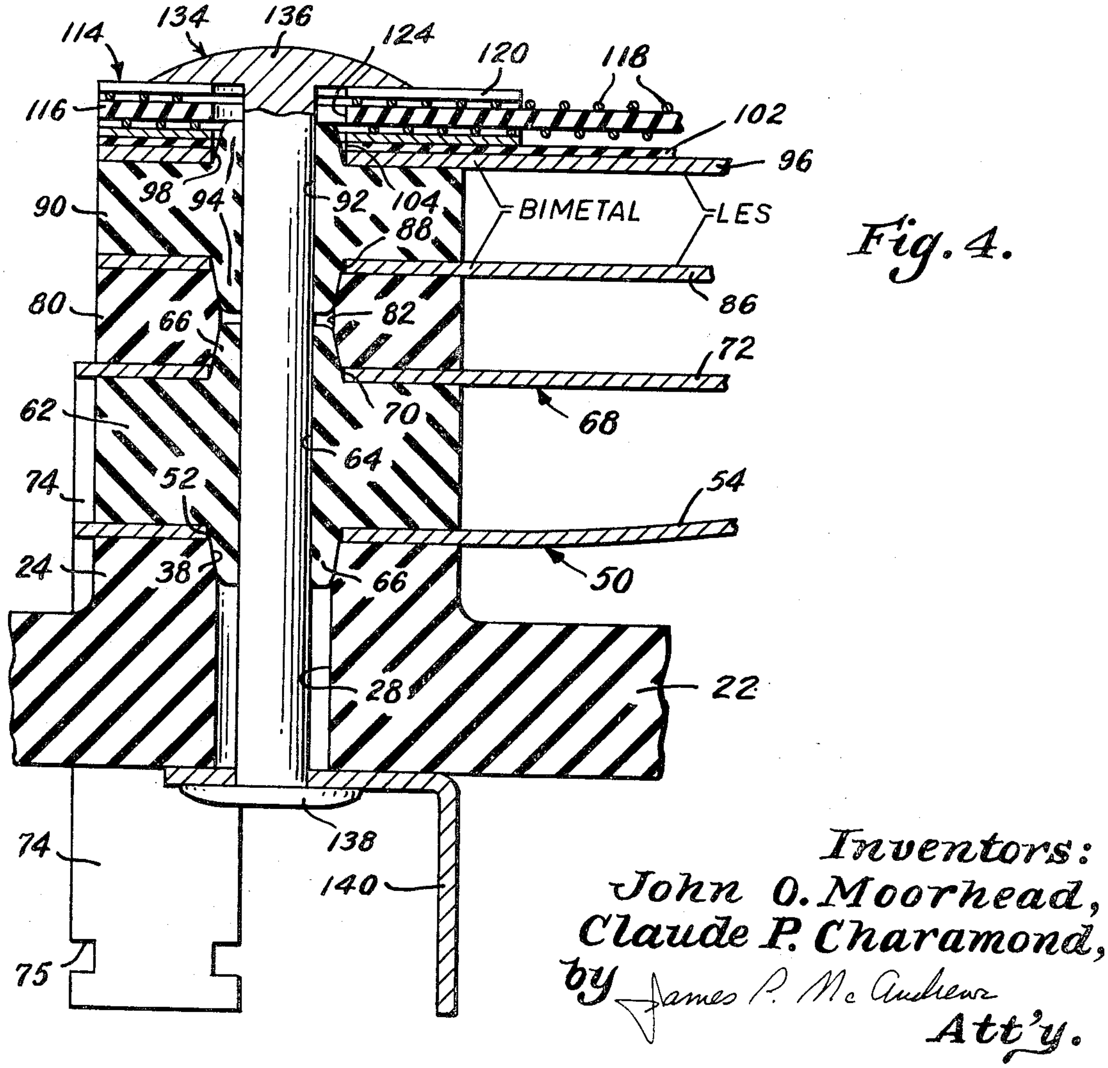
FIG. 4 is a section view along line 4—4 of FIG. 3.

Referring to the drawings, 20 in FIGS. 1–6 indicates a preferred embodiment of the novel and improved single-pole thermal time-delay relay of this invention which is shown to include an insulating base 22 molded of a suitably strong, rigid and electrically insulating material such as phenolic resin or the like. The base is provided with integrally molded bosses 24 and 26 and has a bore or aperture 28 extending through the boss 24, has slot-shaped apertures 30, 32 and 34 extending through the base, and has a threaded recess 36 extending into but not through the boss 26. The bore 28 is preferably countershrunk at 38 as shown in FIG. 4. Preferably blocks 40 are also integrally molded on the base at either end of the slot-shaped base aperture 34, each block having a groove 42 facing the aperture and having a shoulder 44 formed within the groove. Notches 46 and 48 are also preferably molded into the base, one at each edge of the base, the notches 46 preferably being at least partly tapered as shown in FIGS. 2 and 3.

In accordance with this invention, a resilient blade member 50 of an electrically-conductive material such as beryllium-copper is provided with a mounting aperture 52, with an elongated blade leg 54, and with an integral terminal portion 56. As illustrated, this blade member is mounted on the boss 24 so that the blade aperture 52 is aligned with the bore 28 so that the terminal portion 56 fits into the slot-shaped base aperture 30. The blade leg 54 then extends in cantilever relation over the relay base 22 and is provided with a fixed contact 58 which is secured to the distal end of the blade leg in any conventional manner. For example, the contact 58 preferably embodies a material of high electrical conductivity such as silver and has a shank 59 which is fitted into an aperture in the blade and is enlarged for riveting the contact to the blade. The terminal portion 56 of the blade member is preferably notched at 60 to facilitate attachment of wire leads thereto. Preferably the blade leg 54 is slightly bent upwardly, as shown in FIG. 2. A spacer 62, also formed of strong, rigid, electrically insulating material and provided with a central bore 64 and tapered hubs 66 is then fitted on top of the blade member 50 so that one spacer hub extends through the blade member aperture 52 into the countersink portion of the boss 24 and to positively locate the blade member 50 with respect to the base.

A second blade member 68, also having a mounting aperture 70, a blade leg 72, and an integral terminal portion 74 notched at 75, is then mounted on the spacer 62 as shown so that the blade aperture fits over the spacer hub 66 and so that the terminal portion 74 of the blade member fits into the slot-shaped aperture 32 in the base. The blade leg 72 extends in cantilever relation from the spacer 62 in spaced, overlying relation to the blade leg 54 and mounts a movable contact 76 near the distal end of the blade leg 72, the positioning of the blade aperture 70 on the hub 66 and of the terminal portion 74 in the slot 32 serving to precisely locate the blade leg 72 with respect to the blade leg 54. Preferably a pair of tongues or tabs 78 are struck from the blade 72 as shown.

A spacer 80 having a central bore 82, preferably tapering from the ends of the bore towards the center of the bore as shown, is then fitted on top of the blade member 68 so that the spacer bore 82 fits over the spacer hub 66 for centering the spacers 64 and 80 with respect to each other. A strip 86 of termally-responsive bimetallic material having an aperture 88 therein in one end is then mounted on top of the spacer 80 with the strip aperture aligned with the spacer bore 82 and with the body of the strip extending in cantilever relation from the spacer. An additional spacer 90, having a central bore 92 and tapered hubs 94, is then mounted on top of the strip with a hub fitting through the strip aperture into the spacer bore 82, the fitting of the tapered hub into the tapered bore serving to center the spacers 80 and 90 with respect to each other. A second strip 96 of thermally-responsive bimetallic material having an aperture 98 at one end thereof has its aperture fitting over the spacer hub 94, the opposite end of the strip 96 having tongues or tabs 100 struck therefrom as shown. As such thermally-responsive strips are well known in the art, they are not further described herein and it will be understood that the strips comprise two bonded layers of materials of different coefficients of thermal expansion, the strips being adapted to flex when subjected to changes in temperature. In accordance with this invention, the strips 86 and 96 are located on the spacers 80 and 90 with their sides of relatively lower coefficients of thermal expansion (LES) facing each other so that the strips are adapted to flex in opposite directions in response to heat applied to the strips. Preferably a strip 102 of electrically insulating matterial such as polyvinyl chloride film is rested on top of the bimetallic strip 96, the film having a hole 104 at one end fitted over the spacer hub 94 as will be understood. The insulating strip 102 is preferably very thin on the order of 0.002 inch so that the strip has little thermal-insulating effect.

A link 106, preferably formed of insulating material such as fiberboard, is provided with three slots 108, and is fitted over the distal ends of the blade leg 72 and the bimetallic strips 86 and 96, the link engaging the tabs 78 and 100 struck from the blade leg 72 and the bimetallic strip 96 and preferably engaging the shoulders at 110 on the blade leg 72 and at 112 on the strip 96 for securing the link in fixed position with respect to the blade leg 72 and the bimetallic strips 86 and 96. In this construction, the link 106 connects the blade leg 72 and the bimetallic strips 86 and 96 for common, flexing movement as a single unit.

In accordance with this invention, a heater assembly 114 is mounted on the spacer 90 overlying the insulating film 102 in heat-transfer relation to the bimetallic strip member 96. As illustrated, particularly in FIG. 4, the heater assembly includes a pliable core 116 formed of a plastic or mica-base material capable of continuously withstanding temperatures on the order of 275° C. A heater wire 118 is wound upon the core, and heater terminations 120 and 122 are crimped over the heater wire at either end of the heater assembly. In a preferred embodiment of the invention, the heater wire comprises Nichrome wire or other wire capable of displaying substantially increased resistance at elevated temperatures. For example, the wire preferably comprises 0.003 inch diameter Nichrome wire continuously wound on the core at a rate of 40 turns per inch, and the heater terminations 120 and 122 comprise 0.006 inch thick cold-rolled steel electrolytically plated with tin. The heater assembly is provided with a bore 124 extending through the wrap-around heater termination 120, this bore fitting over the hub 94 on the spacer 90 as shown in FIG. 4. The heater termination 122 is provided with a flange portion 126 and has the flange welded in any conventional manner to the heater terminal 128 which is notched at 129 and fitted through the slot 34 in the relay base 22. The terminal 128 is provided with a tab portion 130 partially separated from the terminal by a saw cut or slot (not shown), the tab being bent after insertion through the base slot 34 to engage the underside of the base 22. The terminal 128 is also notched to form shoulders 132 to be engaged with the shoulders 44 in the blocks 40 molded on the base 22. In this arrangement, the engagement of the shoulders 132 and the tab 130 with the base 22 firmly locates the terminal 128 with respect to the base. An electrically conductive rivet 134, preferably formed of steel to provide suitable strength, is then inserted through the bores in the heater assembly, spacers, bimetallic strips, and contact blades as shown in FIG. 4, the rivet head 136 being firmly engaged in electrical contact with the heater terminal portion 120 and the opposite end 138 of the rivet securing a second heater terminal 140 notched at 141 to the underside of the base 22. The rivet and the welded heater terminal 128 cooperate to positively locate the heater assembly in the desired heat-transfer relation to the bimetallic strip 96 with the "hot spot" of the heater accurately positioned with respect to the strip 96. It can be seen that, in the structure above described, the members 50, 68, 86, 96, 102 and 114 are all mounted on the post structure formed by the boss 24 on the relay base, by the spacers 62, 80 and 90, and by the rivet 134, interfitting of the spacers with the rivet and with member apertures serving to accurately locate the noted relay members with respect to each other and also to electrically insulate the blades 50 and 72, the bimetallic members 86 and 96 and the heater 114 from each other. Note that interfitting of the spacer hubs in spacer bores provides increased electrical creep distance between the conductive blade members and the rivet pin 134.

In accordance with this invention, an adjusting screw 142, preferably having an enlarged head, is threadedly engaged in the base recess 36 so that the screw head is adapted to engage the blade leg 54 for adjusting the position of the contact carried by the blade with respect to the contact 76 carried by the blade leg 72. For this purpose, the blade leg 54 preferably has an extending tab 144, shown particularly in FIGS. 3 and 5, this tab having a rounded dimple 146 to facilitate engagement of the leg with the screw head.

A cover 147, preferably comprising a box-like metallic housing having tabs 148 and 149 extending therefrom is then rested on top of the relay base 22 with the tabs 148 and 149 extended into the base notches 46 and 48. The tabs 148 are bent into the notches 46 for securing the cover to the base.

Figure 16:
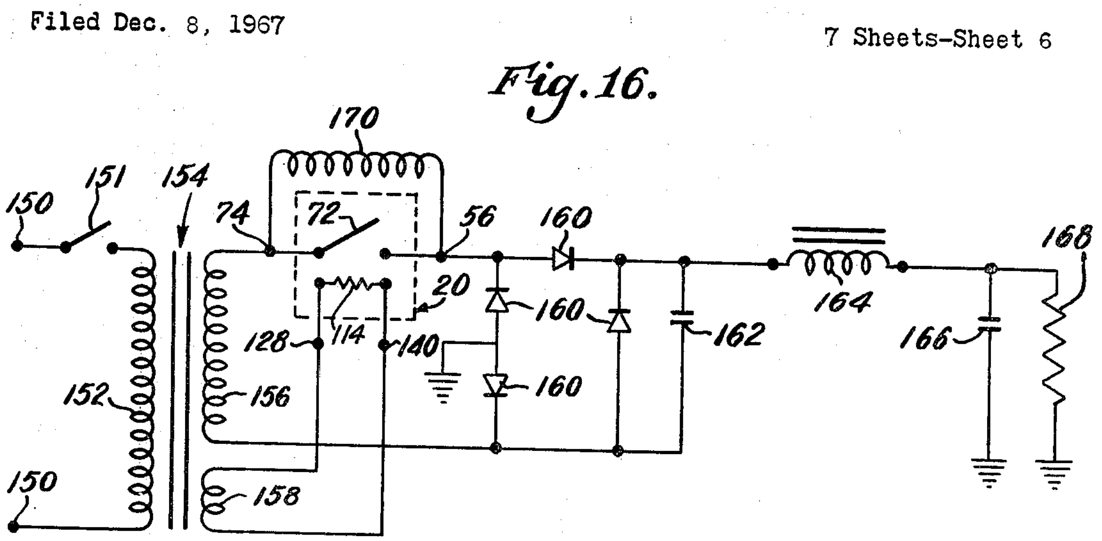
FIG. 16 is a schematic diagram illustrating the utility of the single-pole relays of this invention.

The relay 20 is especially adapted for use in degaussing circuits of color television receivers as is illustrated in FIG. 16. In such circuits, an alternating current source represented by terminals 150 is connectable through a switch 151 to the primary 152 of a transformer 154 in the receiver, the transformer including high and low voltage secondary windings 156 and 158. The high voltage secondary winding 156 feeds a voltage doubler arrangement represented by the diodes 160 and capacitor 162 for developing a direct current voltage having a peak substantially higher than the voltage appearing across the winding 156. A filter circuit for this direct current is diagrammatically indicated by the choke 164 and capacitor 166, the resistance 168 representing the load imposed on the power supply by the receiver circuitry. The low voltage secondary winding 158 supplies heaters for vacumm tubes (not shown) in the television receiver. Degaussing coils, represented by the coil 170 in FIG. 26, are located near the picture tube (not shown) in the television receiver.

In operating such television receivers from a cold start, the amplitude of the current in the transformer winding 156 is initially very high as the filter capacitors of the receiver are charged. This current then rapidly decays to a minimum value near zero for a period of time until the receiver tubes begin to conduct, at which time the current rises to a higher steady value. This initially-high inrush current and period of current decay are conventionally utilized in degaussing the television receiver. That is, the initial current passing through the degaussing coil 170 provides a magnetic field strong enough to overcome any magnetizaton of the receiver and the decay of the alternating current progressively reduces this field to zero in a cyclical manner to complete degaussing of the receiver.

In such a television receiver circuit, the relay 20 of this invention is adapted to shunt the degaussing coil 170 after it has completed its degaussing function. That is, respective ends of the degaussing coil 170 are connected to the relay terminals 56 and 74 whereas the relay terminals 128 and 140 are connected to respective ends of the transformer secondary winding 158. In this arrangement, manual closure of the switch 151 initiates operation of the television receiver as above described and also directs current through the heater means 114 of the relay to energize the heater. The heater means transfers heat to the thermally-responsive strip 96 in the relay while the coil 170 degausses the receiver. After a selected period of time during which degaussing is completed, heating of the strip 96 moves the blade leg 72 of the relay for engaging the relay contacts 76 and 58 to close a circuit between the relay terminals 56 and 74, thereby shunting the degaussing coil 170. The heater means remain heated while the television receiver is continued in operation for maintaining the relay contacts closed, the heater cooling when the receiver is turned off by operating of the switch 151 for resetting the relay contacts in open circuit position.

The relay 20 of this invention is well suited for the described purpose in that the relay is ambient-compensated, fast-acting, easily calibrated, adapted for long and economical service, and is of inexpensive manufacture. That is, the inexpensively arranged bimetallic strips 86 and 96 in the relay are adapted to flex in opposite directions in response to changes in the ambient temperature of the relay. This means that the link 106 does not move during ambient temperature change and assures that the relay contacts remain in open circuit position even though there may be wide variations in the ambient temperature to which the relay is subjected in a television receiver. Yet the thermally-responsive strip 96 responds to heat transferred thereto from the heater means 114 in substantially the same period of time at any ambient temperature. The strip 96 is disposed in closely spaced relation to the heater means and is accurately located with respect to the "hot spot" of the heater means for assuring prompt response of the strip to heat generated by the heater means. In this regard, note that degaussing of the noted television receiver will usually be completed within about 1–3 seconds and that the degaussing coil should be shunted within about 6 seconds to assure that the television viewer does not observe effects of the degaussing operation. The relay 20, although using inexpensive and easily assembled components, is readily capable of assuring shunting of the degaussing coil within the short interval available for this purpose. Further, the relay is easily calibrated by the adjusting screw 142 for setting any required spacing between relay contacts 76 and 58 to adjust the delay provided by the relay without subjecting the thermally-responsive relay element to any forces which would interfere with proper operation of the relay.

The relay is also adapted for long and economical service life in that, the thermaly-responsive strip 96 moves away from the heater means 114 when the heater is generating heat, thereby minimizing or limiting the temperatures to which the strip is subjected during operation of the television receiver. Further, where the heater wire displays increased resistance during heating, as is preferred, power consumption by the heater decreases and heating effect of the heater is reduced as the heater displays its increased resistance. This assures low relay operating costs and further protects the thermally-responsive relay strip 96 from adverse heating effects. Note also that the provision of a separate current-conducting blade leg 72 movable with but electrically insulated from the thermally-responsive strip 96 assures low relay resistance in closed contacts position and avoids self-heating of the strip 96 which would occur if the strip were a current-conducting member. Resilient mounting of fixed relay contact 58 on the blade leg 54 assures the occurrence of wiping action between this contact and the movable relay contact 76 during closing of the relay contacts. This wiping action minimizes contact resistance as will be understood and assures good contact engagement which provides long contact service life. Note that adjustment of the position of the blade leg 54 by the screw 142 does not interfere with this wiping action and, in fact, provides some preloading of the resilient blade leg 54 which assures good contact pressure between the relay contacts in closed-circuit position. In the described construction, the relay 20 is characterized by convenient and accurate assembly of inexpensive components on a single post structure formed by the boss 24 on the relay base, by the spacers 62, 80 and 90, and by the rivet 134. Yet the relay provides fast and accurate operation, economical operation and long service life.

Other alternate and less expensive embodiments of the thermal time delay relay of this invention are illustrated in FIGS. 7–12 in which the same or similar relay components are identified by similar reference numerals. For example, the relay **20*a* illustrated in FIG. 7 substantially corresponds to the relay 20 described above with reference to FIGS. 1–6 but omits the bimetallic member 86 and spacer 80, the relay 20*a* using a spacer 90*a* as shown and incorporating a blade member 68*a* to support a movable contact 76*a*. In this construction, the blade member 68*a* is formed of a bimetallic material having its side of low coefficient of thermal expansion facing the low expansion side of the thermally-responsive member 96*a* as shown. That is, strip 68*a* not only supports the movable contact 96*a* but also serves the function of the bimetallic strip 86 illustrated in FIG. 1. The relay 20*a* is thus fast-acting and ambient-compensated but tends to have a relatively lower current-conducting capacity than the relay in FIGS. 1–6 in that the blade member 68*a* is formed of a bimetallic material rather than a material selected primarily for its current-conducting capacity. Where the spacer 90*a* is suitably larger than the spacer 90 described with reference to FIGS. 1–6, the relay 20*a* can utilize most of the same components used in relay 20**.

Figures 7, 8, 9:
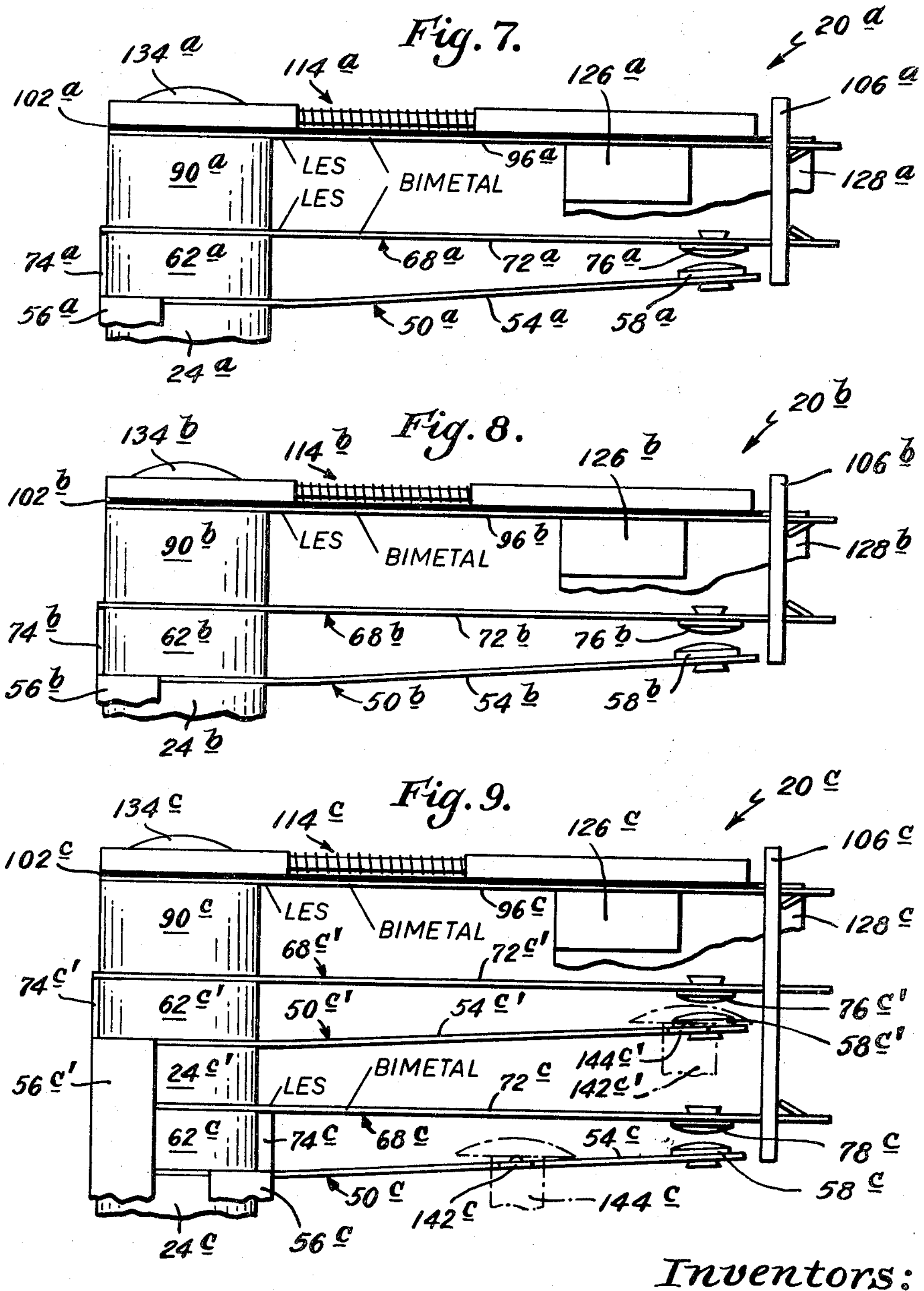
FIG. 7 is a partial view similar to FIG. 2 illustrating an alternate embodiment of the relay of this invention.
FIG. 8 is a partial view similar to FIG. 2 illustrating another alternate embodiment of the relay of this invention.
FIG. 9 is a partial view similar to FIG. 2 illustrating a double-pole embodiment of the relay of this invention.

Alternatively, the relay of this invention is constructed in accordance with the relay **20*b* illustrated in FIG. 8. The relay 20*b* substantially corresponds to the relay 20*a* except that the blade member 68*b* is formed of a material of relatively high current-conducting capacity. Thus the relay 20*b* has a higher current-conducting capacity than the relay 20*a*. However, as the relay 20*b* has no counterpart of the thermally-responsive strip 86 in the relay of FIG. 1, the relay 20*b*** is not ambient-compensated.

Figure 10:
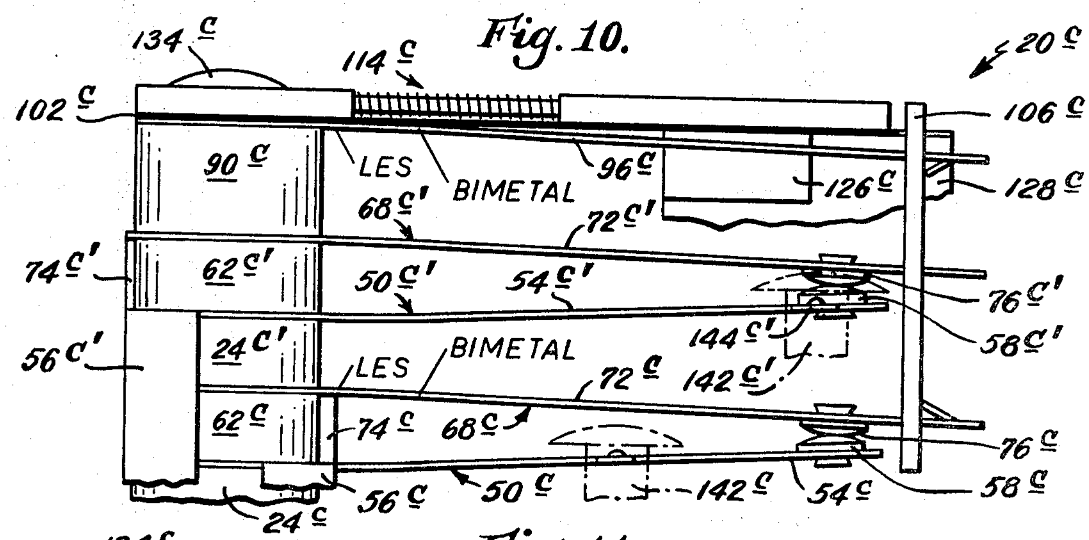
FIG. 10 is a partial view similar to FIG. 9 illustrating the relay of FIG. 9 in contacts-closed position.

In another alternate embodiment of the relay of this invention as illustrated in FIGS 9 and 10, a double-pole relay is provided. That is, a resilient blade member **50*c* supporting a fixed contact 58*c* and having an integral terminal portion 56*c* is mounted on a boss 24*c* on the relay base with the terminal portion 56*c* fitting into a base slot (not shown) as will be understood. A bimetallic blade member 68*c* supporting a movable contact 78*c* and having an integral terminal portion 74*c* is then mounted on the spacer 62*c* for supporting the movable contact in spaced relation to the fixed contact 58*c* previously described. Another spacer 24*c*′ corresponding in function to the boss 24*c* on the relay base then supports an additional resilient blade member 50*c*′ which carries an additional fixed contact 58*c*′ as shown. This additional blade member 50*c*′ also has its integral terminal portion 56*c*′ fitted into a slot (not shown) in the relay base as will be understood. Another spacer 62*c*′ then supports an additional blade member 68*c*′ for supporting an additional movable contact 76*c*′. A spacer 90*c*, a thermally-responsive bimetallic strip 96*c*, an insulator 102*c* and heater means 114*c* are then assembled in the relay 20*c* in the manner described above with reference to the relay 20. The thermally-responsive bimetallic members 68*c* and 96*c* as well as the blade member 68*c*′ are then connected together for flexing movement as a unit by means of a link 106*c*. Adjusting screw means 142*c* and 142*c*′ are then threadedly engaged with the relay base and are engaged with the members 50*c* and 50*c*′ for adjusting the position of the fixed contacts 58*c* and 58*c*′ to calibrate the relay 20*c* as well be understood. In this construction, movement of the thermally-responsive member 96*c*′ in response to heat generated by the heater means 114*c* moves the blade members 68*c* and 68*c*′ for engaging the movable contacts carried thereon with the fixed contacts 58*c* and 58*c*′ as illustrated in FIG. 10 for closing respective circuits between the terminals 56*c* and 74*c* and between the terminals 56*c*′ and 74*c*′**.

Figure 18:
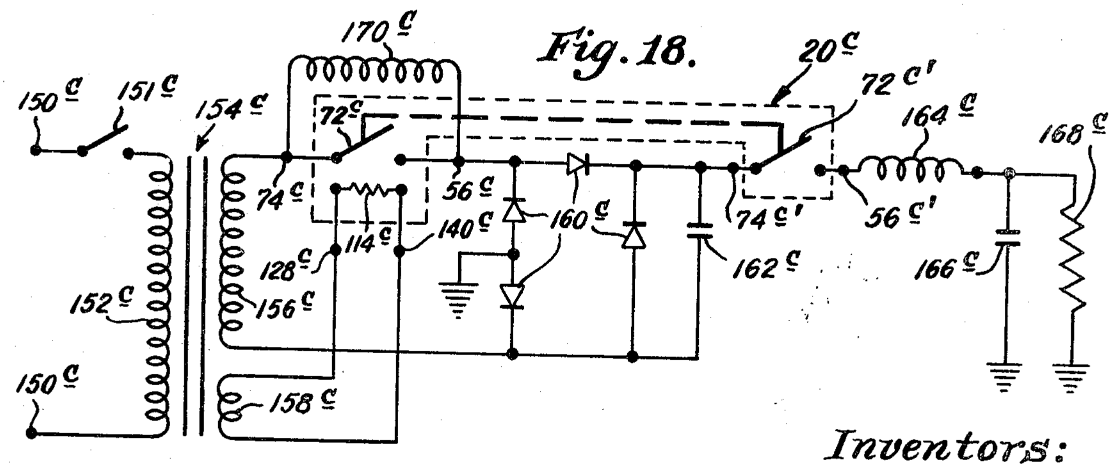
FIG. 18 is a schematic diagram illustrating the utility of the double-pole relays of this invention.

Such a double-pole relay construction as is described with reference to FIGS. 9 and 10 is useful in the degaussing circuit of a color television receiver as is illustrated schematically in FIG. 18. That is, where the receiver substantially corresponds to that schematically described with reference to FIG. 16, the terminals **74*c* and 56*c* are connected to the respective ends of the receiver degaussing coil 170*c* so that the relay blade 72*c* is adapted to shunt the degaussing coil when the movable contact carried by the blade member 72*c* is moved to closed-contacts position. The terminals 74*c*′ and 56*c*′ are then connected to the voltage doubler means and to the filter means respectively of the television receiver as shown so that the blade member 72*c*′ of the relay 20*c* is adapted to be interposed in series between the voltage doubler means and filter means of the receiver when the relay is in closed-contacts position. In this arrangement as will be understood, manual closure of the receiver starting switch 151*c* causes the heater means 114*c* in the relay 20*c* to generate heat for moving the blade members 72*c* and 72*c*′ of the relay to closed-contacts position for shunting the degaussing coil 170*c* within a selected period of time after closure of the switch 151*c*. Movement of the resilient blade 72*c*′ with the blade 72*c* then supplies current to the filter circuit and circuit load of the television receiver only after shunting of the degaussing coil has been accomplished. This operation of the relay 20*c* is especially adapted for use in instant-on color television receivers as will be understood, the decay in the current through the degaussing coil 170*c* being regulated by charging of the capacitor 162*c*** or by other conventional means (not shown) in the receiver circuit.

Figure 11:
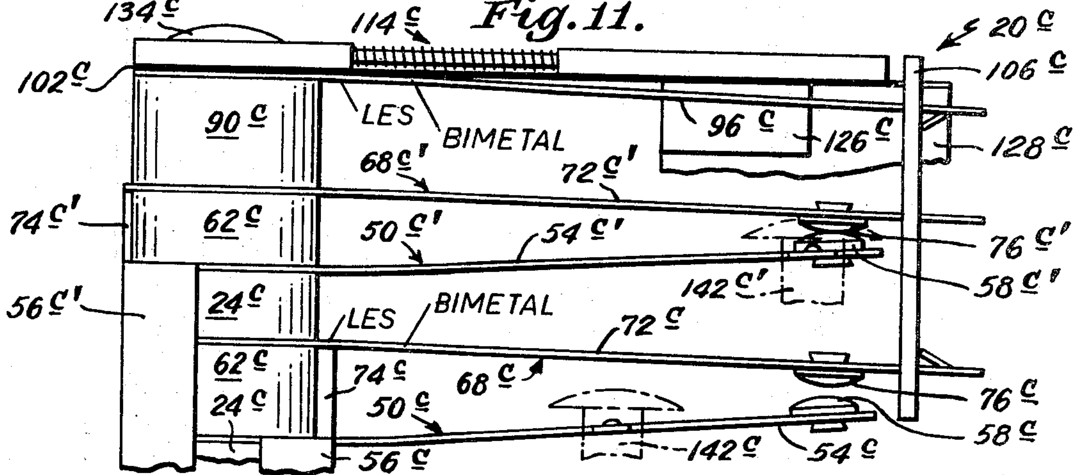
FIG. 11 is a partial view similar to FIG. 10 illustrating an alternate embodiment of the relay of FIG. 9 adapted for sequencing operation.

The relay **20*c* described with reference to FIGS. 9 and 10 is preferably adapted for sequential operation by increasing the spacing between the blade member 50*c* and 68*c* through use of a larger spacer 62*c* or through adjustment of the screw 142*c*. In this arrangement as illustrated in FIG. 11, movement of the thermally-responsive member 96*c* in response to heat generated by the heater means 114*c* moves the contacts 76*c*′ and 76*c* so that the contact 76*c*′ engages the fixed contact 58*c*′ prior to the time that the contact 76*c* engages the fixed contact 58*c*. Further movement of thermally-responsive member 96*c*** then closes a circuit between the contacts 76c and 58c as will be understood. When this relay 20c, adapted for sequential operation, is incorporated in the circuit illustrated in FIG. 18, shunting of the degaussing coil 170c prior to the time that current is supplied to the television receiver filter circuitry is assured.

Figure 12:
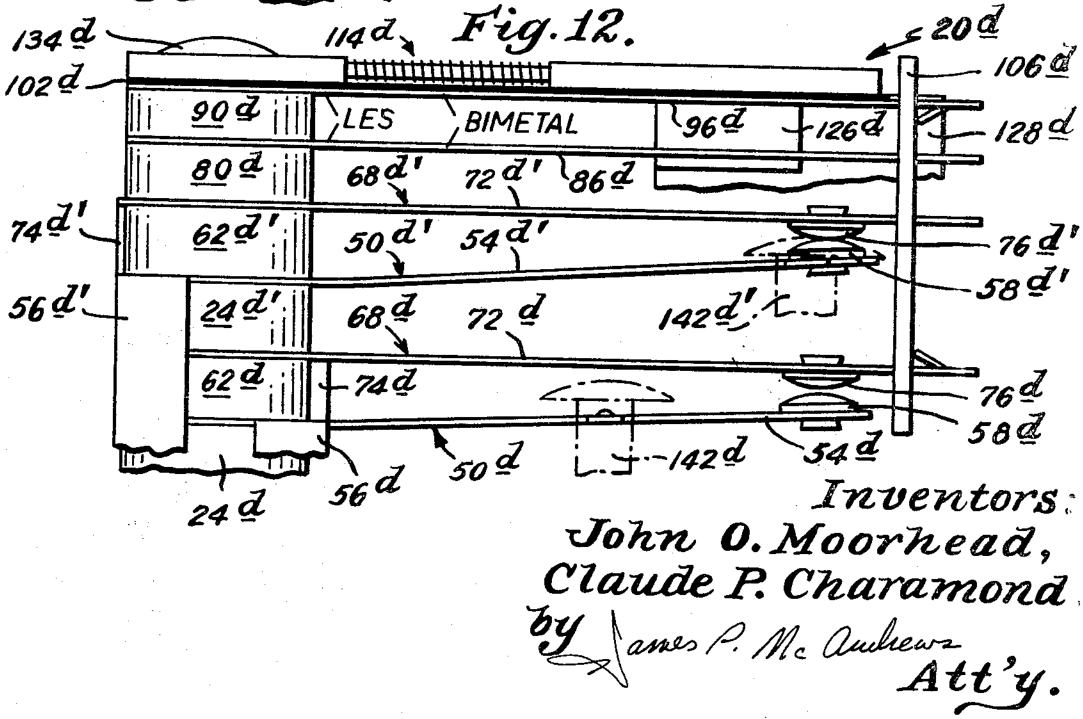
FIG. 12 is a partial view similar to FIG. 2 illustrating another alternate embodiment of the double-pole relay of this invention.

Another alternate construction of the relay of this invention is illustrated in FIG. 12, this relay 20d being similar to the relay 20c previously described but being adapted for higher current-conducting capacity. That is, the relay 20d incorporates a blade member 68d formed of a material other than a bimetallic material especially adapted for current-conducting capacity. The large spacer 90c illustrated in FIGS. 9 and 10 is replaced with a pair of spacers 80d and 90d and an additional bimetallic element 86d is mounted between the spacers 80d and 90d. The opposite end of this bimetallic member 86d is then adapted for movement with the thermally-responsive member 96d and with the blade members 68d and 68d' by means of a link 106d. In this construction, the bimetallic members 86d and 96d are disposed with their sides of lower coefficient of thermal expansion facing each other so that movement of the bimetallic members in response to changes in ambient temperature does not result in movement of the link 106d or of the blade member 68d and 68d'. However, movement of the thermally-responsive member 96d in response to heat generated by the heater means 114d is effective to move the blade members 68d and 68d' to closed-circuit positions as will be understood.

Figure 13:
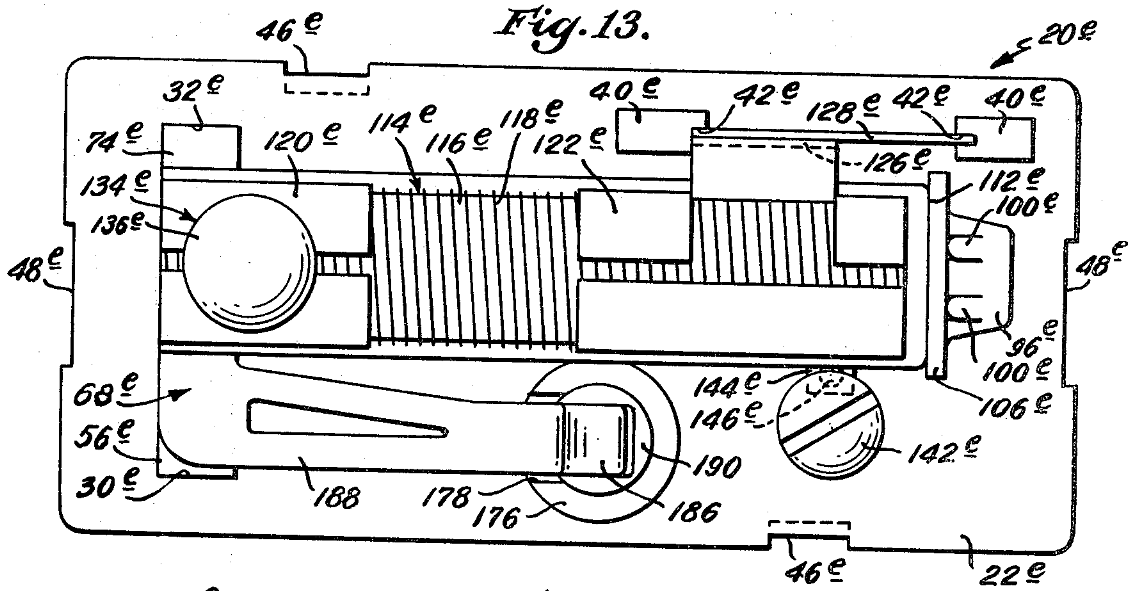
FIG. 13 is a partial view similar to FIG. 2 illustrating another alternate embodiment of the double-pole relay of this invention.
Figure 14:
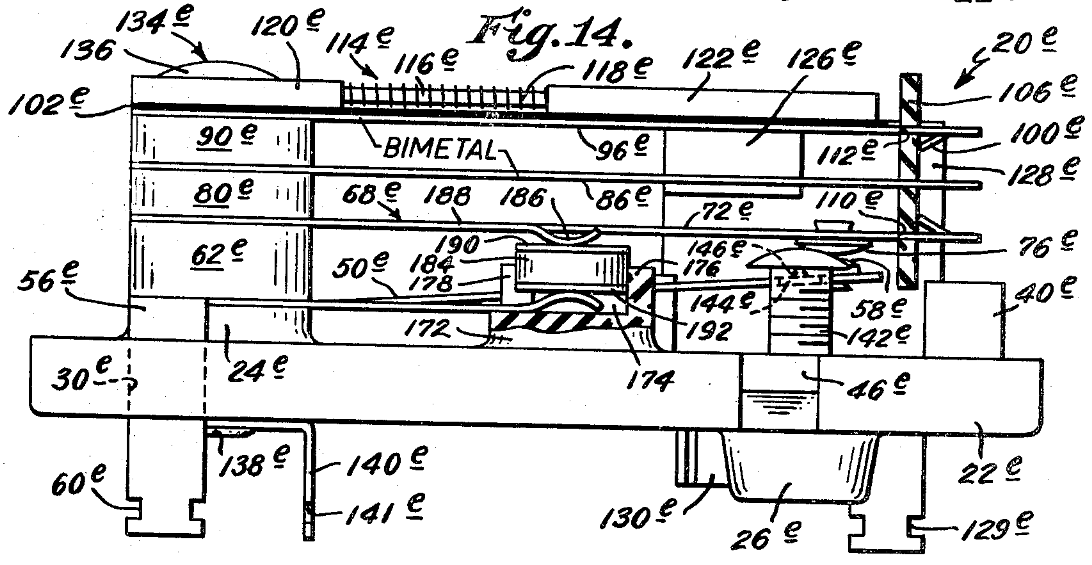
FIG. 14 is a plan view similar to FIG. 1 of an alternate embodiment of the relay of this invention.
Figure 15:
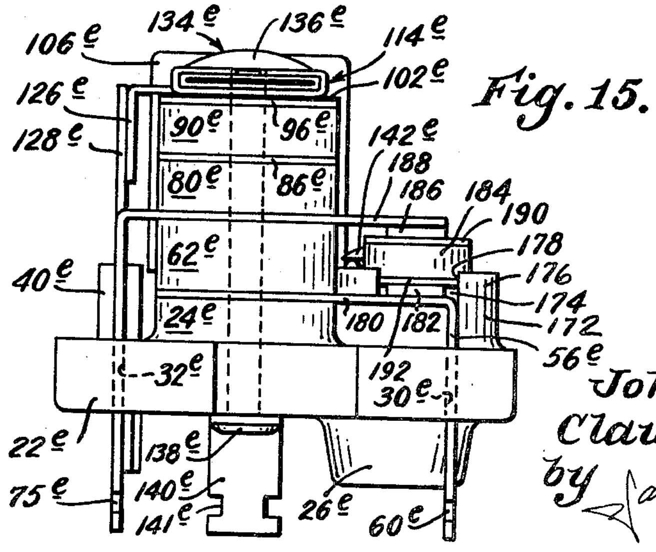
FIG. 15 is an end elevation view of the relay of FIG. 14.

An additional embodiment of the time delay thermal relay of this invention especially adapted for use in instant-on color television receivers is illustrated in FIGS. 13–15. This relay 20e incorporates relay components similar to those described with reference to the relay 20 but additionally includes resistor means of negative temperature coefficient of resistivity connectable in parallel with the relay contacts. That is, as shown in FIGS. 13–15, the relay base 22e is provided with a boss 172 having a recess 174 formed by a wall 176 integral with the boss, the wall being notched at 178 as shown. The blade member 50e of the relay then incorporates an auxiliary arm 180 extending in cantilever relation from the main body of the blade member. The distal end of this auxiliary arm is then deformed as at 182 to provide a rounded surface for good electrical contact with a resistor 184. The relay blade member 68e is also provided with an auxiliary arm 188, the distal end of this arm being deformed as at 186 to engage the opposite side of the resistor 184. In accordance with this invention, the resistor 184 is formed of a material such as lanthanum-doped barium titanate ceramic material having metallic contact surfaces 190 and 192 plated thereon. Such a resistor is well known to display relatively high resistance when electrical current is initially directed through the resistor. However, the resistor is subject to self-heating and the resistance of the resistor progressively decreases with heating, the resistor reaching a point at a selected temperature such that the resistance decreases to effectively terminate resistance to current flow through the resistor.

Figure 17:
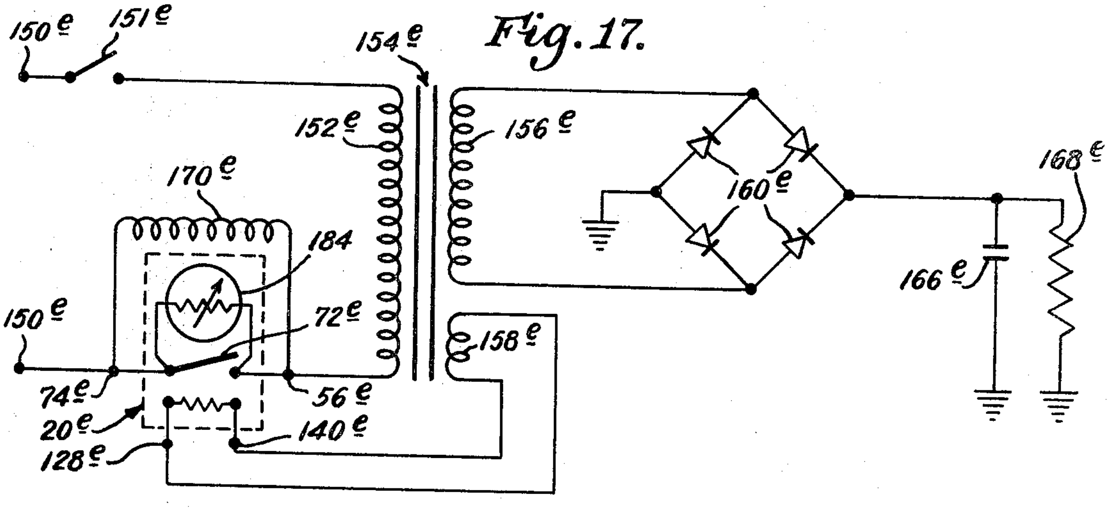
FIG. 17 is a schematic diagram illustrating the utility of the relay of this invention illustrated in FIGS. 14–15.

In this construction, the relay 20e is especially adapted for use in instant-on color television receivers as is illustrated in FIG. 17. That is, where the television receiver includes a transformer 154e, the primary winding 152e of the transformer is connected to line terminals 150e through a manually operable switch 151e. The high voltage secondary winding 156e of the transformer is connected through a voltage doubler represented by the diodes 160e to the receiver capacitor and circuit load represented by the capacitor 166e and a resistor 168e. In this arrangement, a low voltage secondary winding 158e on the transformer is connected to the relay 20e by connecting opposite ends of the winding 158e to the heater terminals 128e and 140e of the relay. The relay terminals 56e and 74e are then connected to a line terminal 150e and to one end of the transformer primary winding as well as to the respective ends of the television receiver degaussing coil 170e for interposing the relay contacts 58e and 76e in series with the primary winding. Closure of switch 151e immediately furnishes current to the degaussing coil 170e and to the resistor 184. As the resistor is heated, its resistance decreases so that current flow through the resistor increases and so that current flow through the degaussing coil decreases, current through the degaussing coil being reduced to almost zero within approximately one second. Thus degaussing of the television receiver is accomplished within this one-second period. Upon closure of the switch 151e, the heater means 114e also immediately begins to generate heat so that within approximately 1.5–3.5 seconds after closure of the switch the thermally responsive member 96e of the relay moves to close relay contacts 76e and 58e for shunting the resistor 184 and the degaussing coil 170e as will be understood. The degaussing coil and the resistor remain in parallel with the relay contacts but impose only slight resistance sufficient to keep the resistor heated in the television circuit after closure of the relay contacts 58e and 76e.

Figure 19:
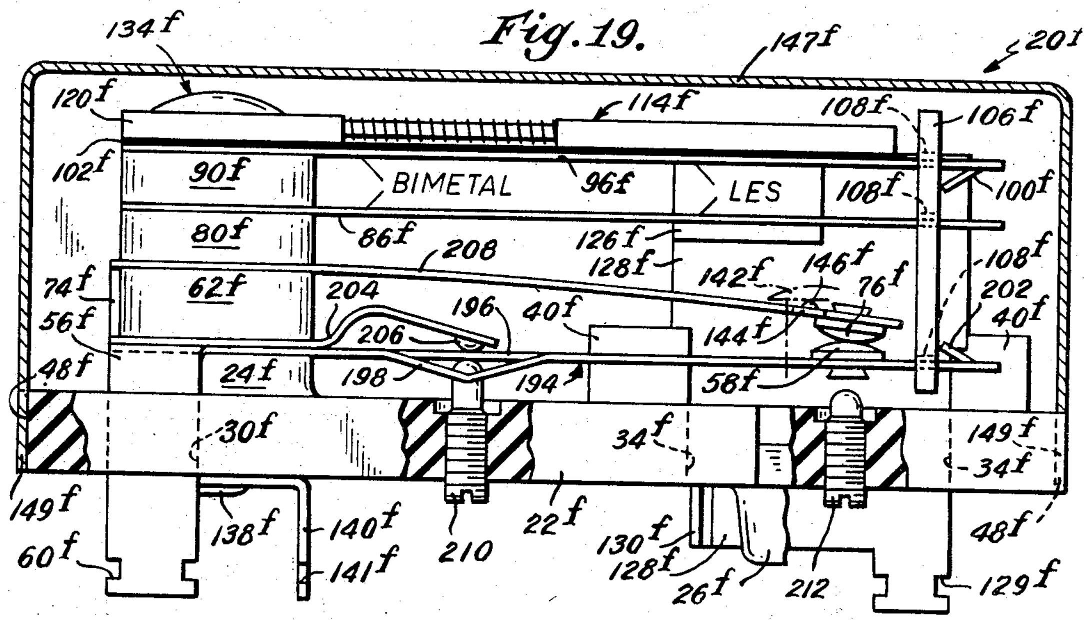
FIG. 19 is a partial view similar to FIG. 2 illustrating another alternate embodiment of the relay of this invention.
Figure 20:
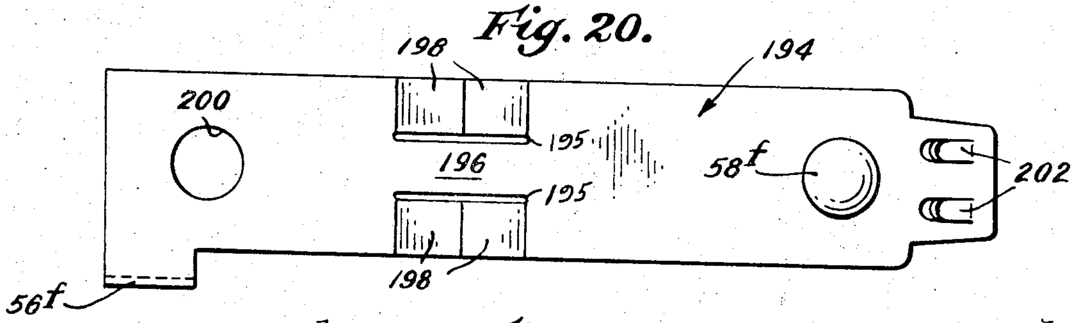
FIG. 20 is a plan view of a snap-acting element embodied in the relay of FIG. 19.

An additional snap-acting embodiment of the relay of this invention is illustrated in FIGS. 19 and 20. This relay 20f incorporates many of the relay components described above with reference to relay 20 but particularly includes a snap-acting blade element 194. This snap element, formed of a resilient, electrically-conductive material such as beryllium copper, has a pair of slots 195 dividing a tensile portion 196 of the element from two lateral arms 198, the arms 198 being crimped as shown to dispose the arm out of the general plane of the snap element. In this construction, the lateral arms 198 are in tension whereas the central portion 196 of the element is in compression so that the snap element tends to curve in one direction or the other and is adapted to be moved with snap action from a curvature in one direction to a curvature in the opposite direction as will be understood. The snap element has a contact 58f mounted thereon at one end, has tongues 202 struck from the element, has an integral terminal portion 56f, and has a mounting bore 200.

In accordance with this invention, the snap element 194 is mounted in cantilever relation on the base boss 24f with the terminal 56f fitted into a base slot 30f. An additional spring 204 having a bore corresponding to the bore 200 is also supported on the boss 24f so that a button 206 fixed to the spring bears against the central portion 196, of the snap element as shown. After mounting of an insulating spacer 62f on top of the spring 204, an additional blade 208 carrying a contact 76f and having an integral terminal portion 74f is mounted on the spacer 62f with the terminal portion 74f fitted into a slot in the relay base. Bimetallic elements 86f and 96f, link means 106f and other relay components as shown are then mounted in the relay in the manner described above with reference to relay 20. In the relay 20f however, the link means 106f are arranged to connect the snap element 194 for common movement with the bimetallic elements 86f and 96f. In the relay 20f, the screw 142f is arranged to bear against the dimple 146f on the blade 208 and additional screw means 210 and 212 are threadedly engaged with the relay base 22f.

In accordance with this invention, the screw 210 is adjusted to bear against the snap element with sufficient force so that the distal end of the snap element tends to move downwardly with the snap action as viewed in FIG. 19 but is just restrained against such movement by a force applied to the snap element by the bimetallic element 96f to the link 106f, thereby to hold the contact 58f engaged with the contact 76f to close a relay circuit between the relay terminals 56f and 74f. In this arrangement, when a circuit is closed between the relay terminals 128f and 140f for energizing the heater means 114f to generate heat, the bimetallic element 96f moves in response to said heat with a selected delay after energization of the heater means, thereby releasing the force restraining movement of the snap element 194. As a result the snap-element moves with snap action to disengage the contact **58*f* from the contact 76*f* to open the relay circuit, the screw 212 serving as a stop to prevent excessive movement of the snap element as will be understood. When the heater means 114*f* is subsequently deenergized, the bimetallic element 96*f* cools and tends to return to its original position, thereby applying gradually increasing force to the distal end of the snap element. When this force becomes sufficient to overcome the tendency of the snap element to curve downwardly as viewed in FIG. 19, the snap element returns to its original position with snap action to reengage the contacts 58*f* and 76*f* to reclose the relay circuit. As the manner of functioning of snap elements similar to element 194 is known in the art, it is not further described herein and it will be understood that the element provides the relay with the desired snap action with a very short delay after energization and deenergization of the heater means 114*f*. Further, because the spacers and other relay components are adapted for inexpensive manufacture, for convenient and accurate assembly, and for precise operation in the manner above described, the snap-action relay 20*f*** has many of the advantageous characteristics of the other relays of this invention.

Figure 21:
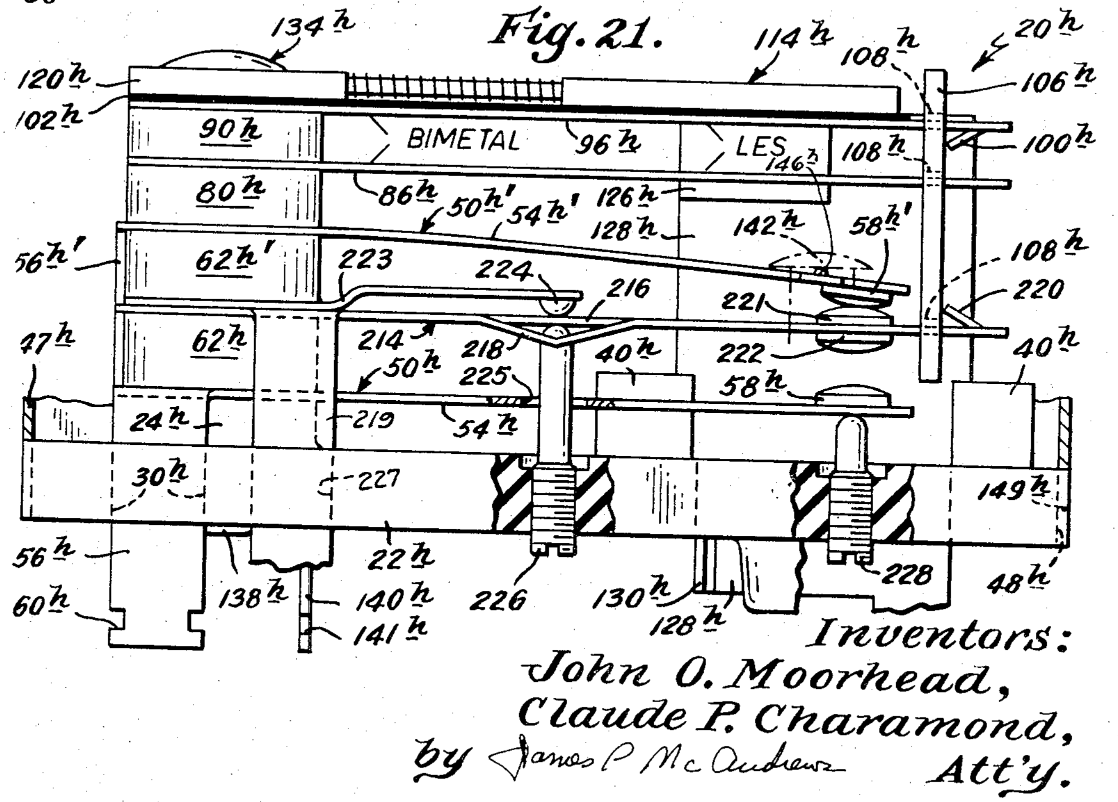
FIG. 21 is a partial view similar to FIG. 19 illustrating another alternate embodiment of the relay of this invention.

In another alternative embodiment of this invention illustrated in FIG. 21, a relay **20*h* is adapted to close alternate relay circuits with a selected time delay after energization and deenergization of the relay heater means. In this relay, a blade member 50*h* having a contact 58*h* mounted thereon and having an intergral terminal portion 56*h* is mounted on the relay base boss 24*h* to extend in cantilever relation from the boss, the distal end of the blade member engaging and adjusting screw stop 228 threadedly engaged in the relay base 22*h* for locating the contact 58*h* in selected position. An insulating spacer 62*h* mounted on top of the boss 24*h* then supports a snap-acting element 214 similar to the snap element 194 above described. That is the snap element 214 has central slots dividing a central portion 216 of the element from lateral arms 218 (only one of which is shown in FIG. 21), these arms being crimped so that the arms are inherently subjected to tension forces while the central portion 218 of the element is subject to compression force. The snap element 214 has a pair of contacts 221 and 222 mounted thereon as shown has tongues 220 struck therefrom, and has an integral terminal portion 219, this terminal portion being fitted within an additional slot 227 at the relay base. An additional spring 223 having a button 224 fixed thereon is then mounted on the spacer 62*h* so that the button bears against the central portion 216** of the snap element.

After mounting of an additional insulating spacer **62*h*' on the spring 223, an additional blade member 50*h*' having a contact 58*h*' and an integral terminal portion 56*h*' is mounted in cantilever relation on the spacer 62*h*', the terminal portion 56*h*' being fitted in an additional slot (not shown) in the relay base 22*h*. The screw 142*h* is adjusted to bear against the dimple 146*h* on the blade 50*h*' for locating the blade contact 58*h*' in selected spaced relation to the contact 58*h*. Bimetallic elements 86*h* and 96*h*, link means 106*h* and other relay components as shown are mounted in the relay 20*h* in the manner previously described, the link 106*h* serving to connect the snap element 214 to the bimetallic elements 86*h* and 96*h*** for common movement therewith.

In this relay, the screw 226 threadedly engaged with the relay base extends through an aperture 225 of the blade **50*h* to engage the snap element 214. This screw 226 is adjusted so that the distal end of the snap element 214 tends to move downwardly with snap action but is restrained against such movement by the bimetallic element 96*h* connected thereto through the link 106*h*. thereby to hold the contact 221 engaged with the contact 58*h*' to close one relay circuit between terminals 56*h*' and 219. When a circuit is closed between the relay terminals 128*h* and 140*h* to energize the heater 114*h*, the bimetallic elements tends to move in response to generated heat with a selected delay after energization of the heater means, thereby releasing the force restraining movement of the snap element 214. As a result, the snap element moves with snap action to disengage contacts 221 and 58*h*' and to engage contacts 222 and 58*h*, thereby to open one relay circuit and to close a second relay circuit between the relay terminals 56*h* and 219. When the heater means 114*h*** is subsequently deenergized, the snap element returns to its original position for snap action as above described to reclose the one relay circuit and to open the second relay circuit as will be understood.

In the relays **20*f* and 20*h* above described, the snap elements 194 and 214, although adapted for conventional snap-over-center movement, are engaged by the adjusting screws 210 and 226 so that all movement of thee lements within the relays occurs at one side of the snap-over-center position of the element. That is, the position of the snap element as illustrated in FIGS. 19 and 21 is close to one side of the snap-over-center position of the element. When the elements are moved to the alternate positions of the elements as above described, the snap elements are merely moved further away from the snap-over-center position of the elements and do not move through the snap-over-center position of the element. Thus the elements are adapted to be moved in response to very little actual movement of the bimetallic elements 96*f* and 96*h***. This feature of the snap elements, combined with the precise location of heater means with respect to bimetallic elements in the relays of this invention, permits the relays to operate with a short and very precisely determined delay after energization of the heater means.

In accordance with this invention, the heater means 114 described with reference to the relay 20, as well as the heaters described with reference to the other disclosed relays, can be replaced with heaters of other inexpensive constructions. For example, the heater can be replaced with a heater of ceramic titanate material or the like having a positive temperature coefficient of resistivity, which material is adapted to display a sharp or anomalous increase resistance at the selected temperature. Such a heater is provided with terminations of any conventional type for making electrical contact with the rivet pin 134 and the terminal 128 as will be understood. When such a heater means is used in one of the described relays, the heater provides sufficient heat-transfer to the thermally-responsive strip 96 of the relay for operating the relay but, upon further heating, the heater means displays a sharp increase in resistance sufficient to maintain heater temperature while effectively minimizing current flow through the heater during subsequent relay operation. Alternatively, the heater means can be replaced with a printed heater of any conventional type within the scope of this invention.

It should be understood that although the thermal time-delay relays of this invention have been described as being useful in degaussing circuits of color television receivers. the relays are also adapted for many other uses. Further, although particular embodiments of the thermal time-delay relay of this invention have been described by way of illustration, this invention includes all modifications and equivalents thereof falling within the scope of the appended claims.

We claim:

1. A thermal time-delay relay comprising an insulating base; a post structure upstanding from said base; a first blade member mounted on said post structure having a first integral blade extending in cantilever relation from said post structure, said first member having an integral terminal extending from said post structure and interfitted with said base to cooperate with said post structure in locating said first blade wtih respect to said base, said first blade having a fixed contact at the distal end thereof; thermally-responsive means including a second blade member mounted on said post structure in electrically insulated relation to said first blade member, said second member having an integral second blade extending in cantilever relation from said post structure in spaced relation to said first blade and having an integral terminal extending from said post structure and interfitted with said base to cooperate with said post structure in locating said second blade with respect to said first blade, said second blade having a movable contact at the distal end thereof, said thermally-responsive means being movable in response to heat applied thereto to engage said movable contact with said fixed contact to close a circuit; and heater means mounted on said base in overlying, heat-transfer relation to said thermally-responsive means, said heater means being energizable to generate heat for moving said thermally-responsive means to close said circuit with a selected time delay after energization of said heater means.

2. A thermal-time delay relay comprising an insulating base; a post structure upstanding from said base; a first blade mounted at one end on said post structure to extend in cantilever relation from said post structure, said first blade having an integral terminal extending from said post structure and interfitted with said base to cooperate with said post structure in locating said first blade with respect to said base, said first blade having a fixed contact at the distal end thereof; a second blade mounted at one end on said post structure in electrically insulated relation to said first blade, said second blade extending in cantilever relation from said post structure in spaced relation to said first blade and having a movable contact at the distal end thereof; said second blade having an integral terminal extending from said post structure and interfitted with said base to cooperate with said post structure in locating said second blade with respect to said first blade, a thermally-responsive bimetallic strip mounted at one end on said post structure in electrically insulated relation to said blades, said strip extending in cantilever relation from said post structure in spaced relation to said second blade and being movable in response to heat applied thereto; link means connecting the distal ends of said strip and second blade for common movement; and heater means mounted on said base in overlying, heat-transfer relation to said thermally-responsive strip, said heater means being energizable to generate heat for moving said thermally-responsive strip and said second blade to engage said movable contact with said fixed contact to close a circuit wtih a selected time delay after energization of said heater means.

3. A relay as set forth in claim 2 wherein said thermally-responsive strip moves away from said heater means in response to heat applied thereto.

4. A relay as set forth in claim 2 wherein said second blade embodies thermally-responsive bimetallic material and is movable in a direction opposite to said thermally-responsive strip in response to heat applied thereto for limiting movement of said second blade in response to change in ambient temperature of the relay.

5. A relay as set forth in claim 2 including a second thermally-responsive bimetallic strip mounted at one end on said post structure in electrically insulated relation to said blades to extend in cantilever relation from said post structure, said second strip having its distal end connected to said link means and being movable in a direction opposite to said first-named thermally-responsive strip in response to heat applied thereto for limiting movement of said second blade in response to change in ambient temperature of the relay.

6. A relay as set forth in claim 2 wherein said second blade is of the snap-acting type movable with snap-action for engaging and disengaging said movable and fixed contacts.

7. A relay as set forth in claim 2 wherein said post structure comprises a plurality of electrically insulating spacers arranged in a stack upstanding from said base, each of said spacers having an axial bore and having a common rod extending through said bores securing said spacers to said base, selected spacers in said stack having tapered hubs coaxial with said bores interfitted with tapered portions of the bores of adjacent spacers in said stack for aligning said spacers in said stack.

8. A thermal time-delay relay comprising an insulating base; a post structure upstanding from said base; a pair of first blades each mounted at one end on said post structure in spaced, electrically insulated relation to each other to extend in cantilever relation from said post structure, said first blades each having a fixed contact at the distal end thereof and each having an integral terminal extending from said post structure and interfitted with said base to cooperate with said post structure in locating said first blades with respect to said base; a pair of second blades each mounted at one end on said post structure in spaced, electrically insulated relation to each other and to said first blades to extend in cantilever relation from said post structure in spaced, overlying relation to respective first blades, said second blades each having a movable contact at the distal end thereof and each having an integral terminal extending from said post structure and interfitted with said base to cooperate with said post structure in locating said second blades with respect to said first blades; a thermally-responsive bimetallic strip mounted at one end on said post structure in electrically insulated relation to said blades, said strip extending in cantilever relation from said post structure in spaced, overlying relation to one of said second blades and being movable in response to heat applied thereto; link means connecting the distal ends of said strip and said second blades for common movement; and heater means mounted on said base in overlying, heat-transfer relation to said thermally-responsive strip, said heater means being energizable to generate heat for moving said thermally-responsive strip and said second blades to engage said movable contacts with respective fixed contacts to close respective circuits with a selected time delay after energization of said heater means.

9. A thermal time-delay relay comprising an insulating base; a post structure upstanding from said base; a first blade member mounted on said post structure having a first integral blade extending in cantilever relation from said post structure and having a fixed contact at the distal end of said first blade, said first member having a first integral auxiliary blade extending from said post structure; thermally-responsive means including a second blade member mounted on said post structure, said second member having an integral second blade extending in cantilever relation from said post structure is spaced, overlying relation to said first blade and having a movable contact at the distal end of said second blade, said second member having a second integral auxiliary blade extending from said post structure, said thermally-responsive means being movable in response to heat applied thereto to engage said movable contact with said fixed contact to close a first circuit; thermistor means releasably held between said auxiliary blades for electrically connecting said thermistor means in parallel with said first circuit; and heater means mounted on said post structure in overlying, heat-transfer relation to said thermally-responsive means, said heater means being energizable to generate heat for moving said thermally-responsive means to close said first circuit to shunt said thermistor means with a selected time delay after energization of said heater means.

10. A relay as set forth in claim 9 wherein said base includes an integral portion defining a chamber at least partially enclosing said thermistor means for retaining said thermistor between said auxiliary blades.

11. A relay as set forth in claim 9 wherein said thermistor means comprises a mass of lanthanum-doped barium titanate material having a negative temperture coefficient of resistivity.

12. A relay as set forth in claim 9 wherein said auxiliary blades are resilient for resiliently gripping said thermistor means therebetween.

13. A thermal time-delay relay comprising an insulating base having a plurality of base apertures; a first terminal; a plurality of electrically insulating spacers arranged in a stack upstanding from said base, said spacers having aligned bores disposed on one of said base apertures; a first blade member having a portion held between a pair of said spacers, having a first integral blade extending in cantilever relation from the spacers, having an integral terminal portion fitted through another of said base apertures to locate said first blade with respect to said base, and having a fixed contact at the distal end of said first blade; a second blade member having a portion held between another pair of said spacers, having an integral second blade extending in cantilever relation from the spacers in spaced overlying relation to said first blade, having an integral terminal portion fitted through another of said base apertures to locate said second blade with respect to said first blade, and having a movable contact at the distal end of said second blade; a thermally-responsive bimetallic strip mounted at one end on top of said spacer stack to extend in cantilever relation from said stack in spaced, overlying relation to said second blade, said strip being movable in response to heat applied thereto; link means connecting the distal ends of said strip and second blade for common movement; a heater mounted at one end on top of said spacer stack in overlying, electrically insulated relation to said strip, said heater having a terminal at its opposite end fitted through another of said base apertures supporting said heater in selected heat-transfer relation to said strip, said heater being energizable to generate heat from moving said strip and second blade to engage said movable contact with said fixed contact to close a relay circuit with a selected time delay after energization of said heater; and a rod electrically connected to said one heater and extending through said spacer bores and said one base aperture for securing said spacer stack to one side of said base, said rod securing said first terminal to the opposite side of said base and electrically connecting said first terminal to said one heater end.

14. A relay as set forth in claim 13 wherein said first and second blade members each have an integral auxiliary blade extending in cantilever relation from said spacers, and wherein a thermistor is releasably held between the distal ends of said auxiliary blades to be electrically connected in parallel to said relay circuit.

15. A relay as set forth in claim 14 wherein said integral auxiliary blades are resilient and each have a rounded surface formed at the distal end thereof for resiliently engaging said thermistor in electrical contact therewith.

16. A thermal time-delay relay comprising an insulating base; a post structure upstanding from said base; a first blade member mounted on said post structure having a first integral blade extending in cantilever relation from said post structure, said first member having an integral terminal extending from said post structure and interfitted with said base to cooperate with said post structure in locating said first blade with respect to said base, said first blade having a fixed contact at the distal end thereof; a second blade member mounted on said post structure in electrically insulated relation to said first blade member, said second member having an integral second blade extending in cantilever relation from said post structure in spaced relation to said first blade and having an integral terminal extending from said post structure and interfitted with said base to cooperate with said post structure in locating said second blade with respect to said first blade, said second blade having a movable contact at the distal end thereof and being of the snap-acting type movable with snap-action between a position normally engaging said movable contact with said fixed contact and a second position holding said movable contact spaced from said fixed contact; thermally-responsive means mounted at one end on said post structure to extend in cantilever relation from said post structure, said thermally-responsive means having its distal end adapted to move in response to heat applied thereto; link means connecting the distal ends of said second blade and thermally-responsive means for common movement; and heater means mounted on said base in overlying heat-transfer relation to said thermally-responsive means, said heater means being energizable to generate heat for moving said thermally-responsive means and second blade with snap action for disengaging said movable contact from said fixed contact with a selected time delay after energization of said heater means.

17. A relay as set forth in claim 16 having a third blade member mounted on said post structure, said third member having an integral third blade extending in cantilever relation from said post structure and having an integral terminal extending from said post structure and interfitted with said base to cooperate with said post structure in locating said third blade with respect to said second blade; said third blade having a second fixed contact at the distal end thereof adapted to engage said movable contact when said second blade is in said second position.

References Cited

UNITED STATES PATENTS

| | | | |
|---|---|---|---|
| 3,322,921 | 5/1967 | Bletz | 337—363X |
| 3,243,554 | 3/1966 | Malone | 337—86X |
| 3,222,481 | 12/1965 | Lorenz | 337—335 |
| 3,221,124 | 11/1965 | Mertler | 337—354 |
| 3,210,502 | 10/1965 | Slonneger | 337—85X |
| 2,848,580 | 8/1958 | De Lancey | 337—101X |
| 2,818,481 | 12/1957 | Nicolaus | 335—135X |
| 2,692,317 | 10/1954 | Bletz | 337—347 |
| 2,336,504 | 12/1943 | Ruben | 337—103 |
| 2,568,323 | 9/1951 | Dales | 337—57 |
| 2,643,311 | 6/1953 | Giuffrida et al. | 337—101 |
| 2,671,836 | 3/1954 | Anger et al. | 335—193 |
| 3,078,361 | 2/1963 | Mason et al. | 219—511 |
| 3,221,284 | 11/1965 | Summerer | 219—505 |
| 3,243,572 | 3/1966 | Vogt et al. | 219—505 |
| 3,358,095 | 12/1967 | Arlin | 337—101 |

BERNARD A. GILHEANY, Primary Examiner

D. M. MORGAN, Assistant Examiner

U.S. Cl. X.R.

337—101, 113, 343, 381